United States Patent
Kawabata et al.

(10) Patent No.: US 9,810,834 B2
(45) Date of Patent: Nov. 7, 2017

(54) OPTICAL SHEET HOLDING STRUCTURE AND DISPLAY APPARATUS

(71) Applicant: Sakai Display Products Corporation, Sakai-shi, Osaka (JP)

(72) Inventors: Ryota Kawabata, Sakai (JP); Kouji Matsumoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/038,855

(22) PCT Filed: Nov. 25, 2013

(86) PCT No.: PCT/JP2013/081630
§ 371 (c)(1),
(2) Date: May 24, 2016

(87) PCT Pub. No.: WO2015/075834
PCT Pub. Date: May 28, 2015

(65) Prior Publication Data
US 2016/0356952 A1    Dec. 8, 2016

(51) Int. Cl.
*F21V 8/00*   (2006.01)
*G02F 1/1333* (2006.01)
(Continued)

(52) U.S. Cl.
CPC ............ *G02B 6/0088* (2013.01); *F21V 17/00* (2013.01); *G02F 1/133308* (2013.01);
(Continued)

(58) Field of Classification Search
CPC .............. G02B 6/0086; G02B 6/0088; G02F 2001/133322; G02F 1/133308
(Continued)

(56) References Cited

U.S. PATENT DOCUMENTS 6,835,961 B2 * 12/2004 Fukayama ........ G02F 1/133308
                                                    257/84
7,118,265 B2 * 10/2006 Cho ................. G02F 1/133308
                                                    349/58
(Continued)

FOREIGN PATENT DOCUMENTS

JP    2003-346536 A    12/2003
JP    2004-279864 A    10/2004
(Continued)

*Primary Examiner* — Robert May
(74) *Attorney, Agent, or Firm* — Bret E. Field; Bozicevic, Field & Francis LLP

(57) ABSTRACT

Provided are an optical sheet holding structure capable of preventing an optical sheet from wrinkling and bending in a display apparatus, and from breakage during a vibration test, thereby preventing occurrence of problems such as uneven luminance, luminance degradation and the like, and a display apparatus including the optical sheet holding structure. A chassis for holding an optical sheet includes an engaging part for engaging the optical sheet. The engaging part includes a base provided to stand on a surface of a holding plate for the optical sheet orthogonally to the holding plate and in the thickness direction of the holding plate, and an engaging portion extending substantially parallel to a holding surface from the front edge of the base toward the outside of the frame of the chassis. A distance between the holding surface of the holding plate for the optical sheet and the surface of the engaging piece facing the holding surface is substantially equal to the thickness of the optical sheet. The cross-section of the base of a central engaging part is formed into a shape substantially identical to the shape of an engagement hole provided in the optical sheet.

10 Claims, 17 Drawing Sheets

(51) Int. Cl.
*G02F 1/1335* (2006.01)
*F21V 17/00* (2006.01)

(52) U.S. Cl.
CPC .................. *G02F 1/133606* (2013.01); *G02F 2001/133317* (2013.01); *G02F 2001/133607* (2013.01); *G02F 2201/46* (2013.01)

(58) Field of Classification Search
USPC .......................................................... 362/58
See application file for complete search history.

(56) References Cited

U.S. PATENT DOCUMENTS

| | | | |
|---|---|---|---|
| 8,902,377 B2* | 12/2014 | Yu | G02F 1/133308 349/58 |
| 2003/0223020 A1 | 12/2003 | Lee | |
| 2005/0099604 A1* | 5/2005 | Mizumaki | G03B 23/08 353/27 R |
| 2006/0212797 A1 | 9/2006 | Kao | |
| 2009/0033827 A1 | 2/2009 | Chen et al. | |
| 2012/0281153 A1 | 11/2012 | Kuromizu | |

FOREIGN PATENT DOCUMENTS

| | | |
|---|---|---|
| JP | 2005-158707 A | 6/2005 |
| JP | 2008-090094 A | 4/2008 |
| WO | WO2011093119 A1 | 8/2011 |

\* cited by examiner

F I G. 3
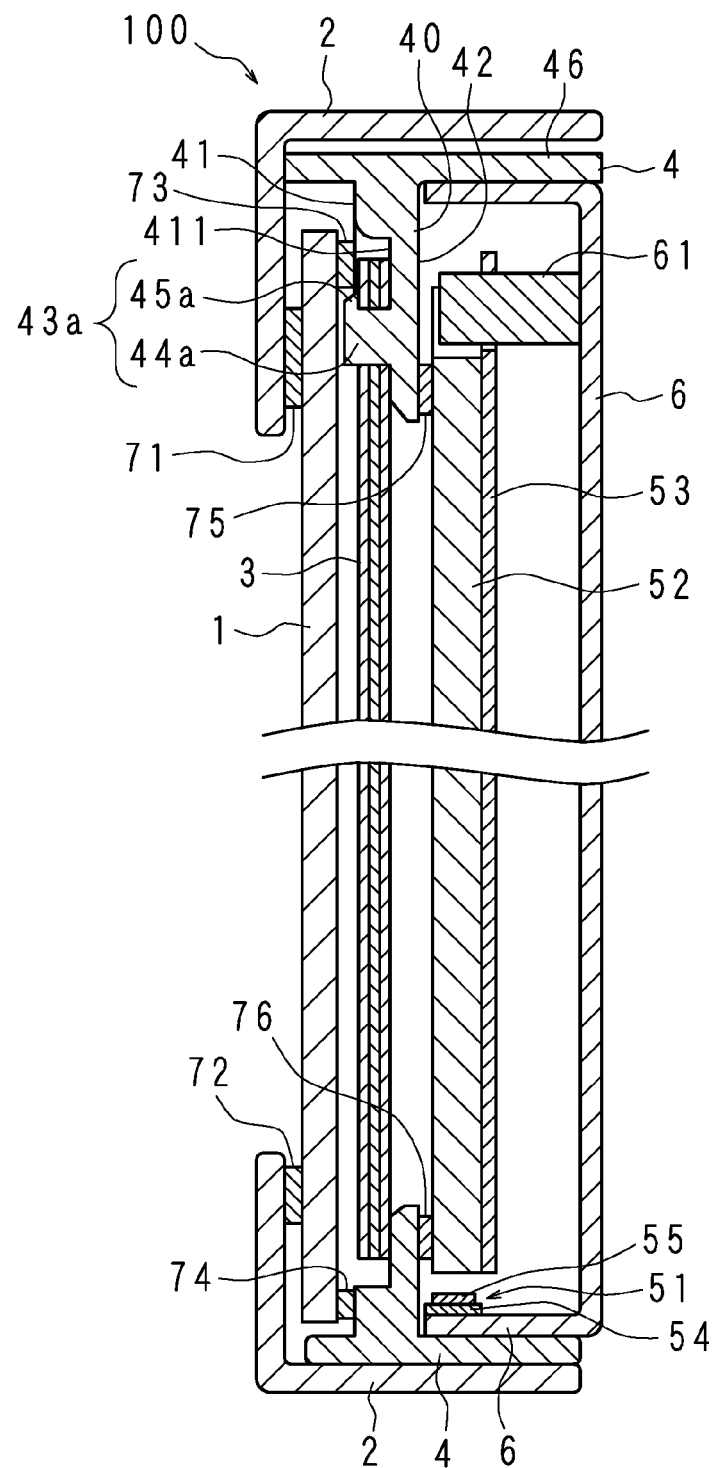

OPTICAL SHEET HOLDING STRUCTURE AND DISPLAY APPARATUS

This application is the national phase under 35 U.S.C. §371 of PCT International Application No. PCT/JP2013/081630 which has an International filing date of Nov. 25, 2013 and designated the United States of America.

BACKGROUND OF THE INVENTION

1. Field of the Invention

The present invention relates to a display apparatus which displays an image using a liquid crystal panel. Particularly, the present invention relates to an optical sheet holding structure and a display apparatus which has the optical sheet holding structure capable of preventing an occurrence of problems such as uneven luminance, or luminance degradation and the like, due to wrinkles, bending, or the like of the optical sheet used in the display apparatus, while achieving slimmed border of the display apparatus.

2. Description of Related Art

A display apparatus using a liquid crystal panel is provided with an optical sheet for diffusing or collecting light emitted from a light source. The optical sheet is provided between the liquid crystal panel and the light source. In this case, it is necessary for the optical sheet to be held by a positioning member so as to be parallel to the liquid crystal panel.

The optical sheet includes one or a plurality of optical films. The optical sheet is thermally expanded due to heat principally from the light source. Thereby, the optical sheet is positioned and held with a margin given by as much as the expansion, in such a way that only a part thereof is fixed to the positioning member. For example, the optical sheet is a rectangular shape, and is provided with a plurality of holes in an edge part on one long side thereof. When penetrating the plurality of holes by positioning pins provided on the positioning member, the optical sheet is hooked thereto. In this case, since an edge part of the optical sheet on a side opposite to the one long side is not fixed, wrinkling or bending does not occur in the optical sheet when thermally expanded.

Further, in the display apparatus, increasing of size and thinning, and slimmed border are required. The holes for positioning of the optical sheet and the positioning member should be provided within a limited range of being hidden by the frame. In addition, various researches are executed on the holding structure of the optical sheet.

SUMMARY OF THE INVENTION

By penetrating and engaging the holes provided in the optical sheet by the positioning pins to hold the sheet, even when the optical sheet is thermally expanded, wrinkling or bending does not occur in the optical sheet. On the other hand, the optical sheet may move in an in-plane direction and a thickness direction, by holding the same with a margin.

In particular, the hole of the optical sheet is larger than the positioning pin. Briefly, there is a gap between the hole and the positioning pin. By having the gap, it is possible to cope with a positional shift of the hole due to the thermal expansion of the optical sheet, and easily perform an assembling process.

However, by having the gap, the optical sheet can move in the plane, and thereby the positional shift occurs in the entire optical sheet. In addition, since a length of the positioning pin is longer than a sheet thickness of the optical sheet, the optical sheet can move also in the thickness direction, and fluctuation occurs.

The positional shift and the fluctuation on the plane of the optical sheet cause to the wrinkling or bending of the optical sheet. Thereby, problems such as luminance unevenness, or a decrease in luminance of display apparatus occurs.

Further, since narrowing of a frame is required, a residual portion on the outside from the hole provided in the edge part of the optical sheet becomes significantly narrower. By having the gap between the hole of the optical sheet and the positioning pin, under a specific condition in which strong vibration is applied such as at the time of a vibration test of the display apparatus or transportation, a force may be applied to the narrow portions on the outside from the hole of the optical sheet, and a breakage of the optical sheet may occur.

In consideration of the above-mentioned circumstances, it is an object of the present invention to provide an optical sheet holding structure capable of preventing an occurrence of wrinkling, bending, and breakage of the optical sheet in a display apparatus, and a display apparatus having the optical sheet holding structure.

An optical sheet holding structure according to one embodiment of the present invention, that the peripheral edge parts of the optical sheet is held by a holding surface of flat and hollow shape, and surrounding an opening of a frame body, is characterized in that the holding surface is provided with an engaging part which is engaged with an engagement hole provided in the peripheral edge part of the optical sheet, the engaging part includes a base provided to stand on the holding surface, and an engagement piece which is provided substantially parallel to the holding surface from a front tip of the base to an outside of the frame body, wherein a length of the base in a direction perpendicular to a circumferential direction of the frame body and a length of the engagement hole in a direction perpendicular to a circumferential direction of the optical sheet are substantially the same as each other, and a distance between the holding surface and the engagement piece is substantially the same as a sheet thickness of the optical sheet.

In the optical sheet holding structure according to the embodiment of the present invention, it is preferable that the base in the engaging part has a cross section substantially the same as a shape of the engagement hole provided in the optical sheet.

In the optical sheet holding structure according to the embodiment of the present invention, it is preferable that a plurality of engaging parts are provided, the plurality of engaging parts are juxtaposed in the circumferential direction of the frame body, and the base of a specific engaging part among the plurality of engaging parts has a cross section substantially the same as a shape of the corresponding engagement hole provided in the optical sheet.

In the optical sheet holding structure according to the embodiment of the present invention, it is preferable that the specific engaging part is one engaging part positioned at a center of the plurality of engaging parts.

In the optical sheet holding structure according to the embodiment of the present invention, it is preferable that the holding surface has a concave formed in a portion thereof facing the engaging piece.

In the optical sheet holding structure according to the embodiment of the present invention, it is preferable that the engaging part has a plurality of engaging pieces which are juxtaposed in the circumferential direction of the frame body from the front tip of the one base.

In the optical sheet holding structure according to the embodiment of the present invention, it is preferable that the base has a front tip face substantially parallel to the holding surface at the front tip, and a peripheral edge of a part of the front tip face opposite to the engaging piece is chamfered in a flat or curved surface.

In the optical sheet holding structure according to the embodiment of the present invention, it is preferable that a length of the cross section of the base in the circumferential direction of the frame body is longer than a length thereof in the direction perpendicular to the circumferential direction.

A display apparatus according to one embodiment of the present invention, includes a display panel, an optical sheet provided behind the display panel, and an optical sheet frame body configured to hold peripheral edge part of the optical sheet at a holding surface of flat and hollow shape, and surrounding an opening of the optical sheet frame body, is characterized in that the optical sheet includes an engagement hole on edge parts thereof, the optical sheet frame body includes an engaging part provided at a position corresponding to the engagement hole of the optical sheet in the holding surface, and being engaged with the engagement hole, the engaging part includes a base provided to stand on the holding surface, and an engagement piece provided substantially parallel to the holding surface from a front tip of the base to an outside of the optical sheet frame body, wherein a length of the base in a direction perpendicular to a circumferential direction of the optical sheet frame body and a length of the engagement hole in a direction perpendicular to a circumferential direction of the optical sheet are substantially the same as each other, and a distance between the holding surface and the engagement piece is substantially the same as a sheet thickness of the optical sheet.

The display apparatus according to the embodiment of the present invention, further comprises a light source device provided on an opposite side of the optical sheet to the display panel, and a light source device frame body configured to position the light source device, wherein the optical sheet frame body and the light source device frame body respectively includes, positioning parts configured to position the optical sheet frame body and the light source device frame body by a positioning pin along a thickness direction in the optical sheet and another positioning pin along a direction perpendicular to the thickness direction.

According to the embodiment of the present invention, the optical sheet in the display apparatus is engaged with the engaging piece provided substantially parallel to the holding surface from the front tip of the base, by inserting the bases provided to stand protrusively from the holding surface into the one or the plurality of engagement holes provided in the peripheral edge parts of the optical sheet. In the direction perpendicular to the circumferential direction of the frame body, since there is no gap between the engagement hole and the base of the engaging part, the optical sheet does not move within the plane. In addition, since the distance between the holding surface and a surface of the engaging piece on the holding surface side is substantially the same as the sheet thickness, the optical sheet does not move in the thickness direction.

According to the preferable embodiment of the present invention, in at least one engaging part, the shape of the engagement hole provided in the optical sheet and the cross section of the base are substantially the same as each other. Since the engagement hole of the optical sheet and the outer periphery of the base which passes through the engagement hole are substantially coincide with each other, the optical sheet does not move within the plane.

According to the preferable embodiment of the present invention, the plurality of engaging parts are juxtaposed in the circumferential direction of the frame body, and the cross section of the base in any specific engaging part is substantially the same as the corresponding engagement hole of the optical sheet in terms of the shape. Since the engaging parts are arranged on a straight line, the optical sheet is accurately positioned and held in the straight line direction. In the specific engaging part, the engagement hole of the optical sheet and the base which passes through the engagement hole have the cross-sectional shape substantially coincide with each other, such that it is difficult for the optical sheet to move within the plane. In the engaging parts other than the specific engaging part, since the base in the circumferential direction of the frame body is shorter than the engagement hole of the optical sheet, there is a gap between the base and the engagement hole. Thereby, wrinkling or bending does not occur when the optical sheet is thermally expanded.

According to the preferable embodiment of the present invention, in the one engaging part located at the center among the plurality of engaging parts, the cross section of the base and the shape of the corresponding engagement hole of the optical sheet are substantially the same as each other, and the optical sheet does not shift at the one center engaging part. The optical sheet is more stably positioned and held, due to being held without positional shift at the center. In addition, in the engaging parts other than the center, since the base is shorter than the engagement hole of the optical sheet in the circumferential direction of the frame body, there is a gap therebetween. Thereby, the wrinkling or bending does not occur when the optical sheet is thermally expanded. Further, it is possible to more decrease a gap between the base and the engagement hole of the optical sheet than the case in which the specific engaging part serves as the engaging part of an end portion.

According to the preferable embodiment of the present invention, the sheet thickness of the optical sheet and the distance between the holding surface and the engaging piece are substantially the same as each other. The concave is provided at the location facing the engaging piece of the holding surface, such that, when the optical sheet is engaged with the engaging part, the concave may become an escape space of the optical sheet to be easily pushed, and thereby improving workability.

According to the preferable embodiment of the present invention, the plurality of engaging pieces are provided parallel to the holding surface from the one base. The number of locations suppressing the optical sheet in the thickness direction is increased, and a force applied in the thickness direction may be received by many points, thus the optical sheet is stably locked and fluctuation is restrained.

According to the preferable embodiment of the present invention, the edge part of the front tip of the base on the side opposite to the engaging piece is chamfered. By the chamfering, when the engagement hole of the edge part of the optical sheet is engaged with the engaging piece, hanging the inner periphery of the engagement hole on the front tip of the base is inhibited, and thereby improving workability.

According to the preferable embodiment of the present invention, the cross section of the base is elongated in the circumferential direction of the frame body. By elongating the cross section, a force applied in an in-plane direction perpendicular to the circumferential direction in the optical sheet may be received by a larger number of points, such that it is possible to effectively restrain the positional shift such as a rotation of the optical sheet within the plane in the direction perpendicular to the circumferential direction.

According to the preferable embodiment of the present invention, the light source device frame body configured to position the light source device provided on the side of the optical sheet opposite to the liquid crystal panel, and an optical sheet frame body configured to hold the optical sheet are positioned with each other by the positioning pins facing the two directions of the thickness direction and the direction perpendicular to the thickness direction in the display panel. Therefore, the light source device frame body and the optical sheet frame body are not positionally shifted. Thereby, it is possible to restrain the positional shift between the optical sheet and the light source device.

According to the present invention, the positional shift on the plane of the optical sheet in the display apparatus, and the fluctuation in the thickness direction may be restrained. Thereby, it is possible to prevent an occurrence of wrinkling, bending, and breakage of the optical sheet in the display apparatus, and prevent problems such as uneven luminance, or luminance degradation.

BRIEF DESCRIPTION OF THE DRAWINGS

FIG. 3 is a longitudinal-sectional view taken on line A-A' of FIG. 1.

DESCRIPTION OF THE PREFERRED EMBODIMENTS

Hereinafter, embodiments of the present invention will be described in detail with reference to the accompanying drawings. Further, in the embodiments which will be disclosed below, an example in which the present invention is applied to a display apparatus using a liquid crystal panel will be described in detail.

Embodiment 1

Figure 1:
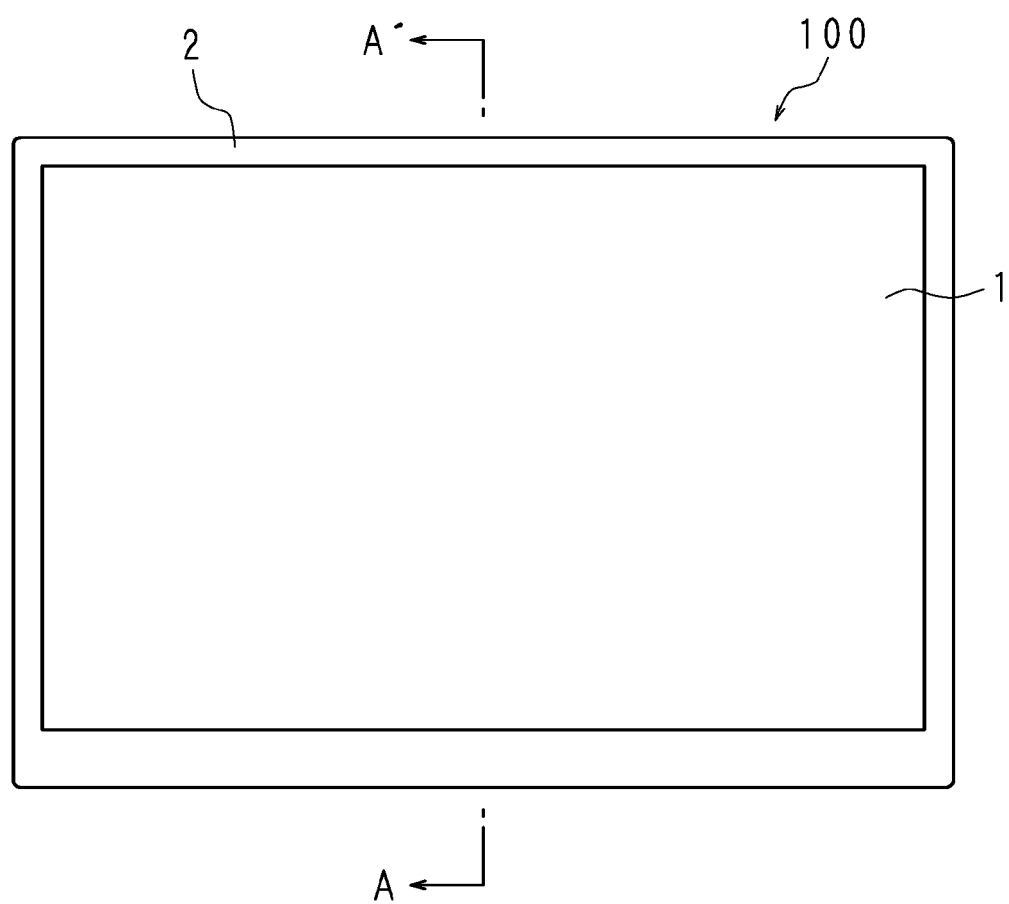
FIG. 1 is a front view illustrating an appearance of a display apparatus according to Embodiment 1.

FIG. 1 is a front view illustrating an appearance of a display apparatus 100 according to Embodiment 1. The display apparatus 100 is formed by positioning and housing a liquid crystal panel 1 and other parts by a plurality of other chassis including a first chassis 2.

Figure 2:
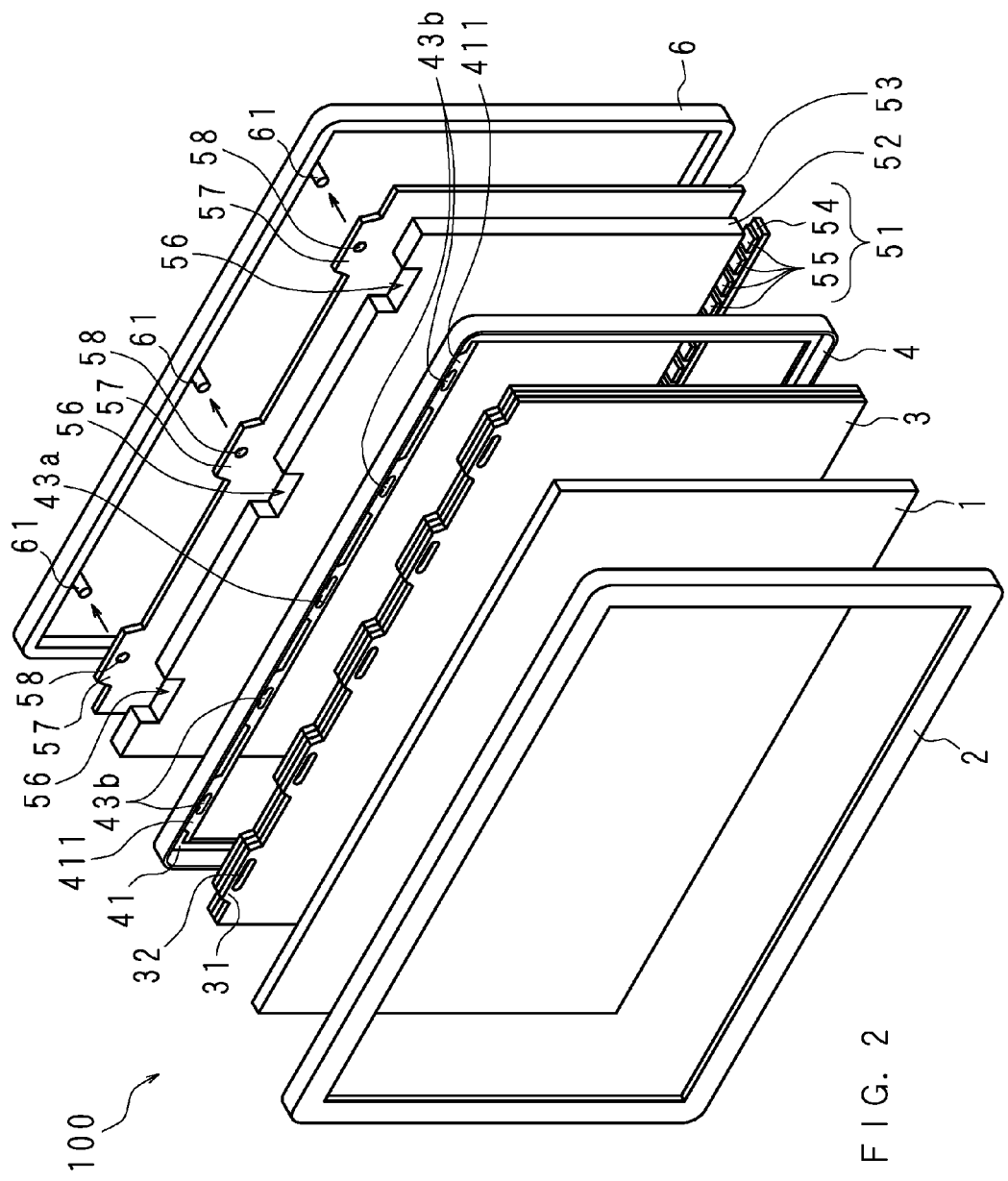
FIG. 2 is an exploded perspective view schematically illustrating main components included in the display apparatus according to Embodiment 1.

FIG. 2 is an exploded perspective view schematically illustrating main components included in the display apparatus 100 according to Embodiment 1, and FIG. 3 is a longitudinal-sectional view taken on line A-A' of FIG. 1.

The display apparatus 100 includes the liquid crystal panel 1, the first chassis 2, an optical sheet 3, a second chassis 4, a light guide plate 52, a light source 51, a reflection sheet 53, and a third chassis 6.

The first chassis 2 is a rectangular frame body. The first chassis 2 includes a rectangular and cylindrical-shaped side plate, and a frame part of an annular plate protruding inward from one end portion of the side plate, and has an L-shaped cross section.

The liquid crystal panel 1 is a display panel, and is formed in a rectangular plate shape. The liquid crystal panel 1 employs an active matrix type. The liquid crystal panel 1 is formed by sealing a liquid crystal between two transparent substrates disposed to face each other at a prescribed interval.

The optical sheet 3 is a rectangular shape, and is an optical sheet group of three sheets whose one prism sheet is sandwiched by two diffusion sheets. The optical sheet 3 has five ear parts 31 on one long side thereof. Each ear part 31 is formed in a tapered trapezoidal shape. Each ear part 31 is provided with an engagement hole 32. The engagement hole 32 is formed in a slot shape elongated in a longitudinal direction of the optical sheet 3.

The second chassis 4 is a frame body provided with a peripheral plate 46 at outer peripheral edges of a rectangular plate-shaped holding plate 40, and a rectangular opening at a central part of the holding plate 40. As illustrated in FIG. 3, the second chassis 4 has a T-shaped cross section having the holding plate 40 as a longitudinal line and the peripheral plate 46 as a horizontal line. In addition, the second chassis 4 is provided with a plurality of engaging parts 43a and 43b at an edge part on the one long side of the one surface 41 of the holding plate 40. The plurality of engaging parts 43a and 43b include a total of five engaging parts of a center engaging part 43a and the engaging parts 43b. The engaging parts 43a and 43b will be described in detail below. Further, one edge part of the surface 41 is provided with reception parts 411 (holding surfaces) for receiving edge parts on the ear part 31 side of the optical sheet 3. The reception part 411 is formed copying the shape of the edge part on the ear part 31 side of the optical sheet 3, so as to be recessed with a depth substantially the same as a sheet thickness of the optical sheet 3, or a depth of the sheet thickness or more (slightly deeper than the sheet thickness).

The light source 51 is achieved by arranging a plurality of light emitting diodes (LEDs) 55 on an elongated substrate 54 in the longitudinal direction.

The light guide plate 52 is formed in a rectangular plate shape. The light guide plate 52 is made of, for example, a high transparency resin such as an acrylic resin. The light guide plate 52 has three notches 56 in an edge part on the long side thereof. Each of the notches 56 is formed by cutting off the light guide plate 52 in a rectangle in the thickness direction.

The reflection sheet 53 is a rectangular optical sheet having a reflection function. The reflection sheet 53 has three convex parts 57 on one long side thereof. Each convex part 57 is provided with a substantially circular hole 58.

The third chassis 6 is formed in a rectangular parallelepiped box shape with one surface open. The third chassis 6 is provided with three columnar members 61 arranged at an edge part on one long side of a bottom thereof in the longitudinal direction. Each columnar member 61 is formed in a substantially cylindrical shape, and is provided to stand on the bottom of the third chassis 6.

The above-described respective elements are assembled as described below to form the display apparatus 100.

First, the reflection sheet 53 is installed on the bottom of the third chassis 6. Three convex parts 57 of the reflection sheet 53 and three columnar members 61 of the third chassis 6 have a positional relationship corresponding to each other. The hole 58 of the convex part 57 has a shape substantially the same as the cross-sectional shape of the columnar member 61. The reflection sheet 53 is held by penetrating the holes 58 of three convex parts 57 by the three columnar members 61 of the third chassis 6, respectively.

The light source 51 is installed inside of a side face on the one long side opposite to the side provided with the columnar members 61 of the third chassis 6 in the longitudinal direction, so that an emission direction thereof is oriented inwardly.

The light guide plate 52 is also installed in the third chassis 6. The light guide plate 52 is installed so that an end face on a side opposite to the notches 56 faces the light source 51, and one wide surface faces a reflection surface of the reflection sheet 53. A size of the wide surface of the light guide plate 52 is substantially equal to or slightly smaller than the size of the reflection sheet 53. In addition, a length on one long side of the light guide plate 52 is substantially the same as the length of the arranged light emitting diodes 55 of the light source 51. Three notches 56 of the light guide plate 52 are provided for avoiding the columnar members 61 passing through the holes 58 of the reflection sheet 53.

Next, the second chassis 4 is installed so as to cover the opened one surface of the third chassis 6 with the holding plate 40. An inner periphery of the peripheral plate 46 of the second chassis 4 is larger than the outer periphery of a side plate of the third chassis 6. The inner periphery of the peripheral plate 46 of the second chassis 4 is fitted to the outer periphery of the side plate of the third chassis 6 on which the light source 51, the light guide plate 52, the reflection sheet 53 and other parts are placed. In this case, the second chassis 4 is fitted, so that one long side on the engaging parts 43a and 43b thereof corresponds to the notches 56 side of the light guide plate 52, and the surface 42 on the side opposite to the surface 41 provided with the engaging parts 43a and 43b of the holding plate 40 faces the third chassis 6. By fitting the second chassis 4 and the third chassis 6 with each other, the reflection sheet 53 and the light guide plate 52 are positioned, and other parts (not illustrated) are housed therein. The size of the opening in the holding plate 40 of the second chassis 4 is smaller than the wide surface of the light guide plate 52, and the surface 42 of the holding plate 40 of the second chassis 4 is adapted so as to press the peripheral edge part of the light guide plate 52 through spacers 75 and 76.

Linear light from the light source 51 is made incident inside of the light guide plate 52 from an end face which faces the light source 51 of the light guide plate 52, and is repeatedly subjected to a total reflection by the reflection sheet 53 and a partial reflection by the other surface to proceed in the light guide plate 52. The light in the light guide plate 52 is emitted from the wide surface on the side opposite to the reflection sheet 53 as flat light. As described above, the light source device by the edge light type is achieved.

The optical sheet 3 is held by the second chassis 4 so as to cover the opening of the holding plate 40 of the second chassis 4. The size of the optical sheet 3 is larger than the opening of the second chassis 4, and the peripheral edge parts of the optical sheet 3 are held by the reception parts (holding surfaces) 411 among the annular surfaces 41 of the holding plate 40. The second chassis 4 positions and holds the optical sheet 3 by engaging the engagement holes 32 in the ear parts 31 of the optical sheet 3 to the respective engaging parts 43a and 43b. A holding structure of the optical sheet 3 by the engaging parts 43a and 43b will be described below in detail. As described above, the optical sheet 3 held by the second chassis 4 diffuses light made incident on one surface of the light guide plate 52 side, and emits flat light having more uniform luminance distribution from the opposite surface.

The liquid crystal panel 1 is provided at a position on the side of the optical sheet 3 opposite to the light guide plate 52 side, so that a display surface thereof faces the side opposite to the optical sheet 3. The size of the liquid crystal panel 1 is slightly larger than the optical sheet 3. The liquid crystal panel 1 is placed on residual portions of the reception parts 411 of the optical sheet 3 in the holding plate 40 of the second chassis 4 through spacers 73 and 74, and is pinched between a frame part of the first chassis 2 through spacers 71 and 72. Further, a polarizing plate (not illustrated) is provided on a surface of the liquid crystal panel 1 on a side opposite to the display surface thereof. Furthermore, the liquid crystal panel 1 may be provided with a protective sheet, a glass plate, or the like on the display surface side thereof.

The size of the opening of the first chassis 2 is smaller than the display surface of the liquid crystal panel 1, and the inner periphery of the side plate of the first chassis 2 is larger than the outer periphery of the peripheral plate 46 of the second chassis 4. The second chassis 4 is adapted so that an outside of the peripheral plate 46 thereof is fitted to an inside of the side plate of the first chassis 2. In this case, the display surface of the liquid crystal panel 1 is exposed from the opening of the frame part of the first chassis 2, and thereby it is possible to view from the outside.

In the display apparatus 100 constituted as described above, flat light which is emitted from the optical sheet 3 and has a uniform luminance distribution is made incident on the side opposite to the display surface of the liquid crystal panel 1, and is modulated at locations corresponding to a plurality of pixels based on image signals by the liquid crystal panel 1. Thereby, a viewer may view a moving image by the display apparatus 100.

Narrowing of a frame is required in the display apparatus 100. To achieve narrowing of the frame, an area of a portion which holds the peripheral edge parts of the liquid crystal panel 1, the optical sheet 3, the light guide plate 52 and the reflection sheet 53 in the first chassis 2 and the second chassis 4 is limited. In particular, the second chassis 4 holds the large-size optical sheet 3 by the narrow reception parts (holding surfaces) 411. In this case, there are problems to be solved of preventing wrinkles or bending of the optical sheet 3 due to an influence of heat inside the display apparatus 100, and preventing a breakage of the peripheral edge part of the engagement hole 32 under a specific condition such as at the time of a vibration test or transportation thereof.

Therefore, the second chassis 4 of the display apparatus 100 according to Embodiment 1 has a holding structure capable of accurately positioning and stably holing the optical sheet 3 even when the area of the peripheral edge part is small. Hereinafter, the structure of the center engaging part 43a of the second chassis 4 will be described in detail. The structure of the other engaging parts 43b is the same as the center engaging part 43a, therefore will not be described in detail, and a difference between the center engaging part 43a will be described below.

Figure 4:
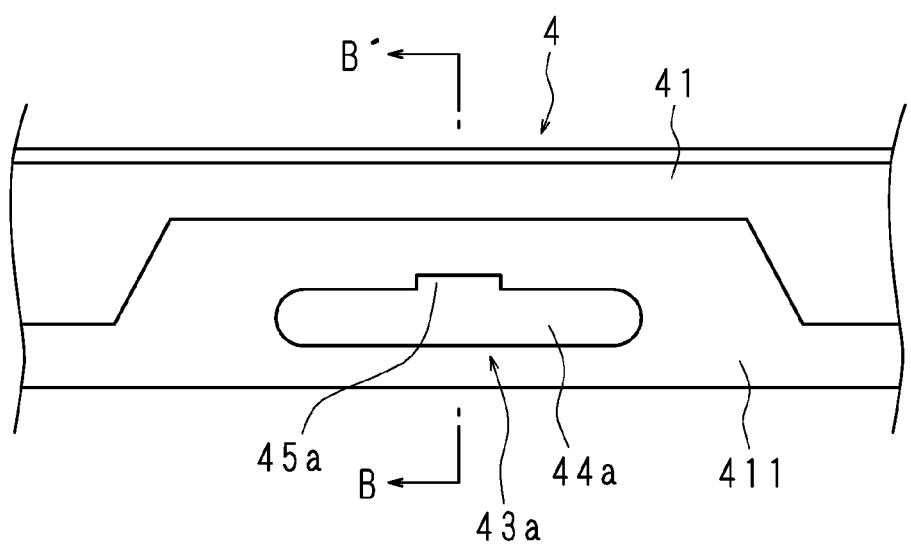
FIG. 4 is a front view schematically illustrating an edge part of a second chassis according to Embodiment 1.
Figure 5:
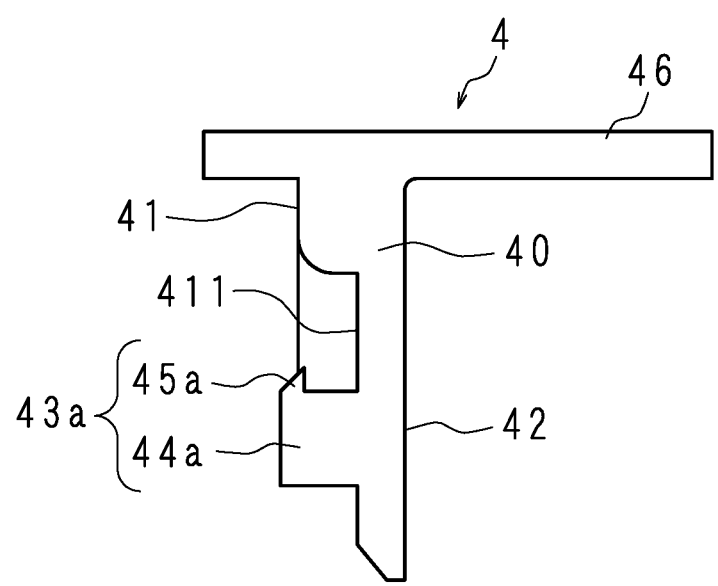
FIG. 5 is a longitudinal-sectional view taken on line B-B' of FIG. 4.

FIG. 4 is a front view schematically illustrating an edge part of the second chassis 4 according to Embodiment 1, and FIG. 5 is a longitudinal-sectional view taken on line B-B' of FIG. 4. FIG. 4 shows a periphery of the center engaging part 43a in an enlarged form, among the edge parts provided with the engaging parts 43a and 43b of the second chassis 4 according to Embodiment 1.

The engaging part 43a is provided on the reception part 411 of one surface 41 of the second chassis 4. The engaging part 43a has a base 44a provided to stand on the reception part 411. A length of the base 44a in an erection direction is slightly longer than the thickness of the optical sheet 3. The base 44a has a cross-sectional shape substantially the same as the shape of the engagement hole 32 provided in the ear part 31 of the optical sheet 3, while also having substantially the same size. Specifically, the base 44a according to Embodiment 1 has a cross section formed in a slot shape elongated in a longitudinal direction of the second chassis 4.

Further, the engaging part 43a has an engaging piece 45a at a front tip of the base 44a. The engaging piece 45a is provided so that a part in the vicinity of a center of the long side on the outside the frame among the long sides in the front tip face of the base 44a extends to the outside of the frame with a prescribed width. The width of the engaging piece 45a according to Embodiment 1 is about ⅓ of the length of the cross section of the base 44a. In addition, the engaging piece 45a has an inclined face at a front tip side of the base 44a so as to have a thickness decreased toward a tip.

The engaging part 43a is formed in a hook shape in a longitudinal cross-sectional view passing through the engaging piece 45a. A distance between a surface of the engaging piece 45a facing the surface of the reception part 411 and the surface of the reception part 411 is substantially the same as the sheet thickness of the optical sheet 3.

Figure 6:
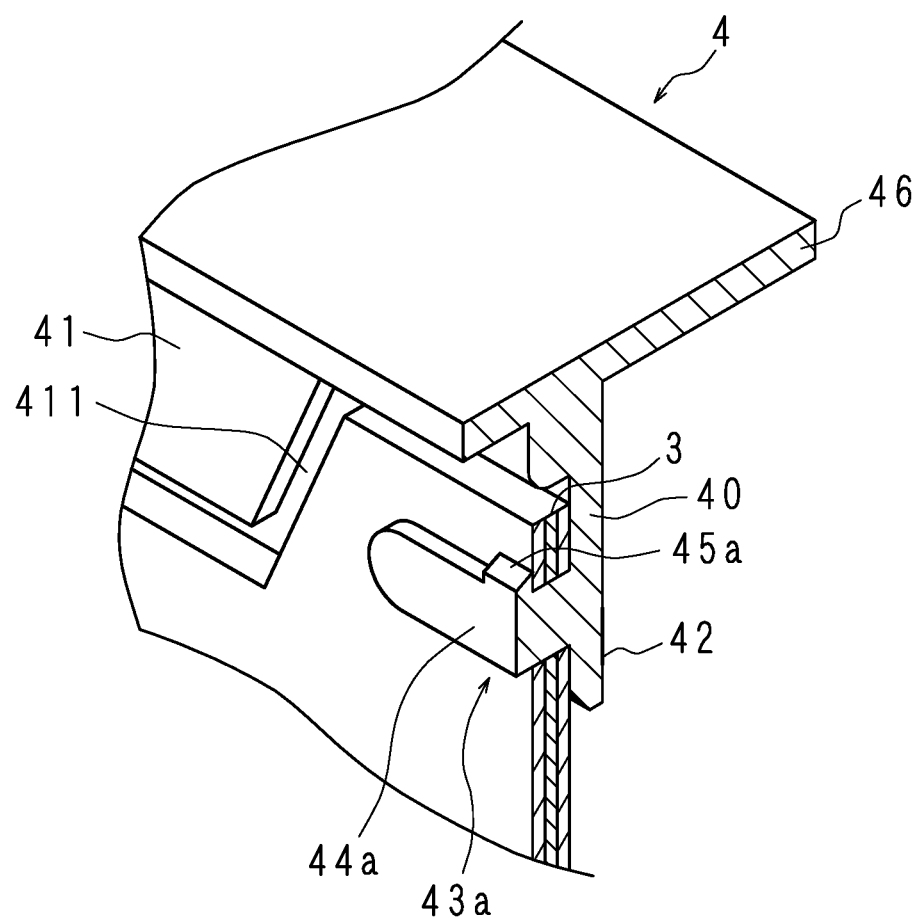
FIG. 6 is a perspective view schematically illustrating an engaging part according to Embodiment 1.

By the above-described configuration, the engaging part 43a may stably hold the optical sheet 3. FIG. 6 is a perspective view schematically illustrating the engaging part 43a according to Embodiment 1. FIG. 6 illustrates an appearance in which the optical sheet 3 is locked by the engaging part 43a, as viewed from an inclination direction when cutting the edge part provided with the engaging part 43a of the second chassis 4 by the line B-B'. Since the engagement hole 32 in the ear part 31 of the optical sheet 3 and the base 44a have cross-sectional shapes substantially the same as each other, it is difficult for the optical sheet 3 to occur a shift within the plane. Since a distance between a surface on the reception part 411 side of the engaging piece 45a of the engaging part 43a and the surface of the reception part 411 is substantially the same as the sheet thickness of the optical sheet 3, the optical sheet 3 hardly causes a shift also in the thickness direction, and does not flop. Further, when engaging the optical sheet 3 to the engaging part 43a of the second chassis 4 during assembling the display apparatus 100, the outside of the ear part 31 of the optical sheet 3 may be bent to be hung on the engaging piece 45a, such that a decrease in workability may be kept to a minimum.

Figure 7:
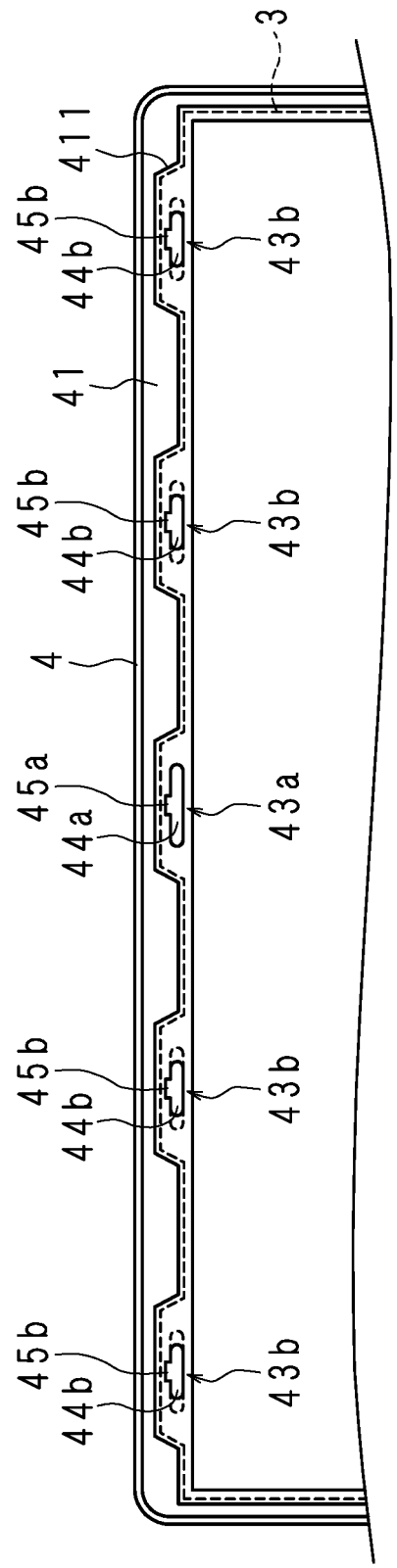
FIG. 7 is a front view illustrating a plurality of engaging parts according to Embodiment 1.

FIG. 7 is a front view illustrating a plurality of engaging parts 43a and 43b according to Embodiment 1. As illustrated in FIG. 7, long sides of the cross section of the bases 44a and 44b of the plurality of engaging parts 43a and 43b are the same straight-line shape as each other. Also, in both of the engaging parts 43a and 43b, the length of the cross section of the bases 44a and 44b in a lateral direction thereof is substantially the same as the length of the engagement hole 32 in the ear part 31 of the optical sheet 3 in the lateral direction thereof. Thereby, an accuracy of positioning of the optical sheet 3 in the lateral direction is improved. Since the optical sheet 3 cannot move in the lateral direction of the optical sheet 3, the positional shift of the optical sheet 3 within the plane may be restrained to prevent the wrinkling or bending.

Further, in the engaging parts 43b other than the center, the length of an elliptical cross section of the base 44b is shorter than the length of the engagement hole 32 in the ear part 31 of the optical sheet 3, as illustrated in FIG. 7. Since the length of the elliptical cross section of the base 44b in the engaging parts 43b other than the center is shorter than the length of the engagement hole 32, a shift of the position of the engagement hole 32 in a length direction thereof when the optical sheet 3 is thermally expanded may be absorbed to prevent the wrinkling or bending, and the hanging operation of the optical sheet 3 on the engaging parts 43a and 43b may be easily performed.

Furthermore, in Embodiment 1, the shape and size of all the engagement holes 32 in the plurality of ear parts 31 of the optical sheet 3 are the same as each other. However, the shape and size of the plurality of engagement holes 32 may not always equal to each other. The optical sheet 3 may be constituted so that the size of the engagement hole 32 other than the center among five engagement holes 32 thereof is larger than that of the center engagement hole 32. In this case, in the base 44a of the center engaging part 43a of the second chassis 4 and the bases 44b of the engaging parts 43b other than the center, the lengths of elliptical cross sections may be the same as each other. Further, the shape of the five engagement holes 32 may be entirely different from each other, and between the corresponding bases 44a and 44b, the lengths of the cross-sectional shape in the lateral direction may substantially coincide with each other. In particular, in a pair of corresponding engagement hole 32 and the base 44a, if the shape and size thereof are substantially the same as each other, it is possible to prevent the positional shift.

Further, the light source device of the display apparatus 100 is not limited to the edge light type using the light emitting diodes 55 as above described above. For example, a direct type LED backlight device may be used. In addition, the light source 51 is not limited to the case of including the substrate 54 and the light emitting diodes 55, and a cold cathode fluorescent lamp (CCFL), hot cathode fluorescent lamp (HCFL), external electrode fluorescent lamp (EEFL) or the like may be used. Furthermore, in Embodiment 1, the light source 51 is installed so as to irradiate light inwardly from the inside of one side face on the inner long side of the third chassis 6, but it is not limited thereto, and the light source may be installed so as to irradiate light inwardly from the inside of the side face on the short side thereof.

Embodiment 2

Figure 8:
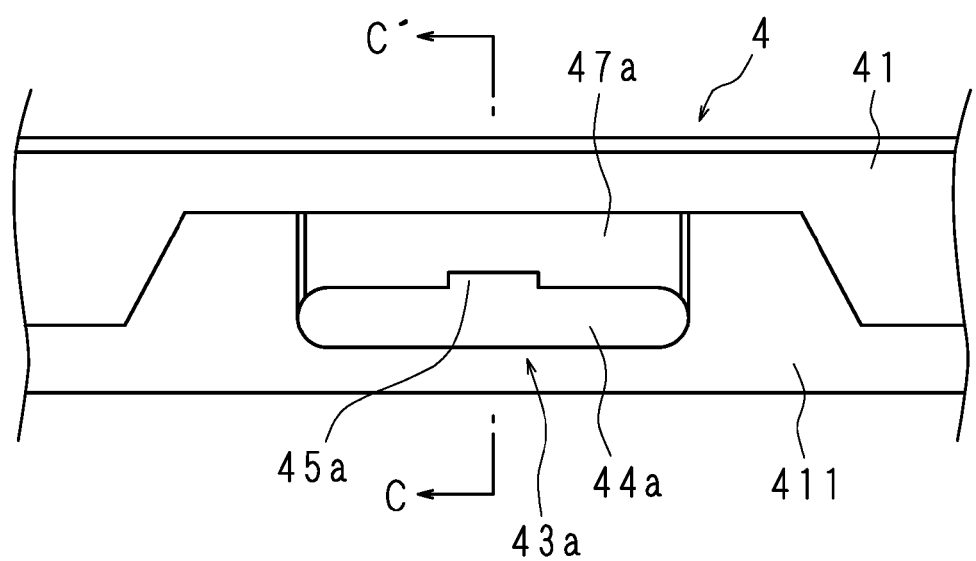
FIG. 8 is a front view schematically illustrating an edge part of a second chassis according to Embodiment 2.
Figure 9:
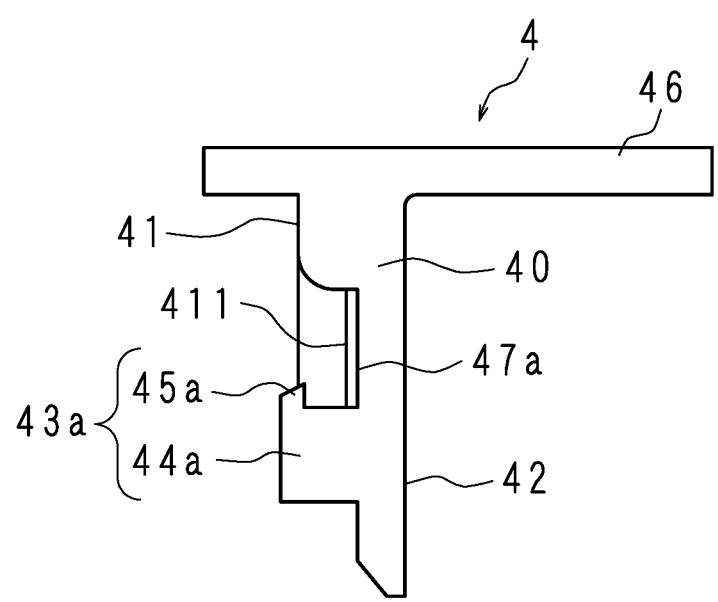
FIG. 9 is a longitudinal-sectional view taken on line C-C' of FIG. 8.

The shape of the engaging part is not limited to the shape disclosed in Embodiment 1. FIG. 8 is a front view schematically illustrating an edge part of a second chassis 4 according to Embodiment 2, and FIG. 9 is a longitudinal-sectional view taken on line C-C' of FIG. 8. A configuration of the second chassis 4 according to Embodiment 2 is the same as the configuration according to Embodiment 1 other than the shape of a holding surface 41 which will be described below. Therefore, the configuration equivalent thereto will be denoted by the same reference numerals, and will not be described in detail.

FIG. 8 shows a periphery of a center engaging part 43a in an enlarged form, among the edge parts provided with engaging parts 43a and 43b of the second chassis 4 according to Embodiment 2. In Embodiment 2, an escape part (concave) 47a recessed in the thickness direction is provided at a portion of the reception part 411 facing an engaging piece 45a, that is, at a location where the outer edge part of the ear part 31 of the optical sheet 3 abuts. The escape part 47a is recessed with a depth substantially the same as the length of the elliptical cross section of the base 44a. Other engaging parts 43b are also provided with the escape parts in the same way.

The width and length of the escape part 47a, and the depth of the concave are not limited to the example illustrated in FIG. 8, and may be appropriately designed.

The escape part 47a becomes an escape space of the ear part 31, when engaging the optical sheet 3 to the engaging parts 43a and 43b of the second chassis 4 during assembling the display apparatus 100, and an operation of pushing the ear part 30 to hang on the engaging pieces 45a and 45b may be easily performed.

Further, the escape part 47a illustrated in Embodiment 2 may also be applied to the engaging parts illustrated in Embodiments 1, and 3 to 7.

Embodiment 3

Figure 10:
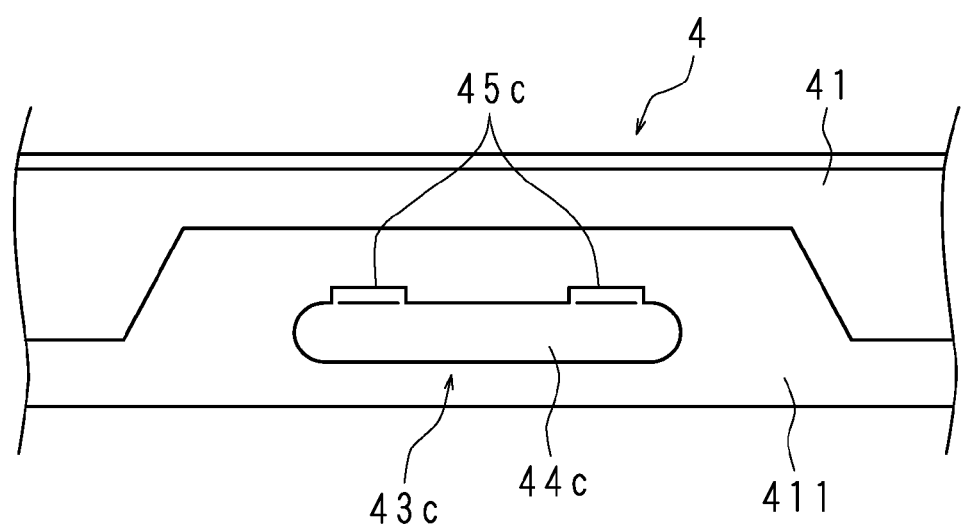
FIG. 10 is a front view schematically illustrating an edge part of a second chassis according to Embodiment 3.

FIG. 10 is a front view schematically illustrating an edge part of a second chassis 4 according to Embodiment 3. Since the longitudinal section of an engaging part 43c according to Embodiment 3 passing through an engaging piece 45c is the same as the longitudinal section of the engaging part 43a according to Embodiment 1, the cross-sectional view thereof will not be illustrated. A configuration of the second chassis 4 according to Embodiment 3 is the same as the configuration according to Embodiment 1 other than the shape of the engaging part 43c. Therefore, the configuration equivalent thereto will be denoted by the same reference numerals, and will not be described in detail.

The engaging part 43c of Embodiment 3 has a plurality of engaging pieces 45c. Specifically, in the engaging part 43c according to Embodiment 3, two engaging pieces 45c are formed by respectively extending a front tip of a base 44c from both ends thereof to the outside of the frame of the second chassis 4 in the longitudinal direction thereof.

By providing the plurality of engaging pieces 45c as illustrated in Embodiment 3, the number of locations suppressing the optical sheet 3 in the thickness direction is increased, and a force applied in the thickness direction of the optical sheet 3 may be received by many points. Therefore, fluctuation of the optical sheet 3 may be further restrained.

Further, the plurality of engaging pieces 45c illustrated in Embodiment 3 may also be applied to the engaging parts illustrated in Embodiments 1, 2 and 5 to 7.

Embodiment 4

Figure 11:
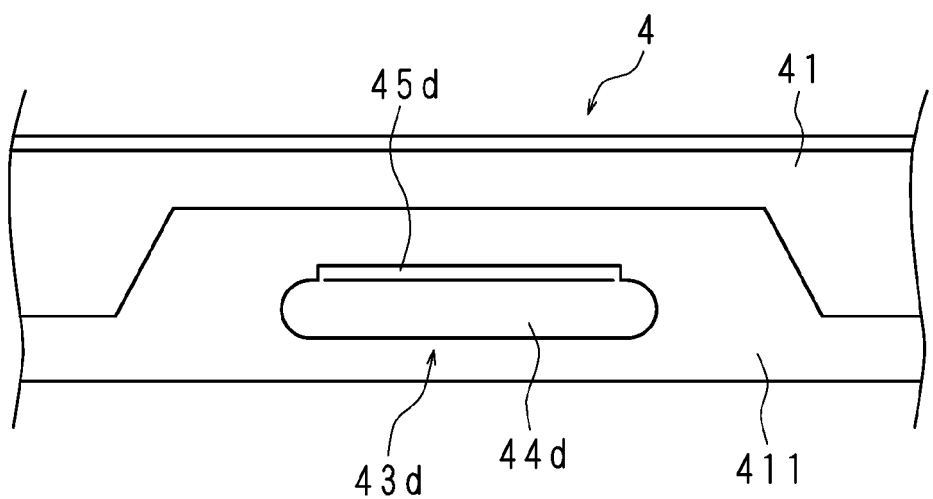
FIG. 11 is a front view schematically illustrating an edge part of a second chassis according to Embodiment 4.

FIG. 11 is a front view schematically illustrating an edge part of a second chassis 4 according to Embodiment 4. Since the longitudinal section of an engaging part 43d according to Embodiment 4 passing through an engaging piece 45d is the same as the longitudinal section of the engaging part 43a according to Embodiment 1, the cross-sectional view thereof will not be illustrated. A configuration of the second chassis 4 according to Embodiment 4 is the same as the configuration according to Embodiment 1 other than the shape of the engaging part 43d. Therefore, the configuration equivalent thereto will be denoted by the same reference numerals, and will not be described in detail.

The engaging piece 45d of Embodiment 4 is provided so as to be continued over an entire length of a base 44d.

As illustrated in Embodiment 4, since the engaging piece 45d has a wide configuration, the force applied in the thickness direction of the optical sheet 3 may be received by a wider surface, and therefore, the fluctuation of the optical sheet 3 may be further restrained.

Further, the wide engaging piece 45d illustrated in Embodiment 4 may also be applied to the engaging parts illustrated in Embodiments 1, 2 and 5 to 7.

Embodiment 5

Figure 12:
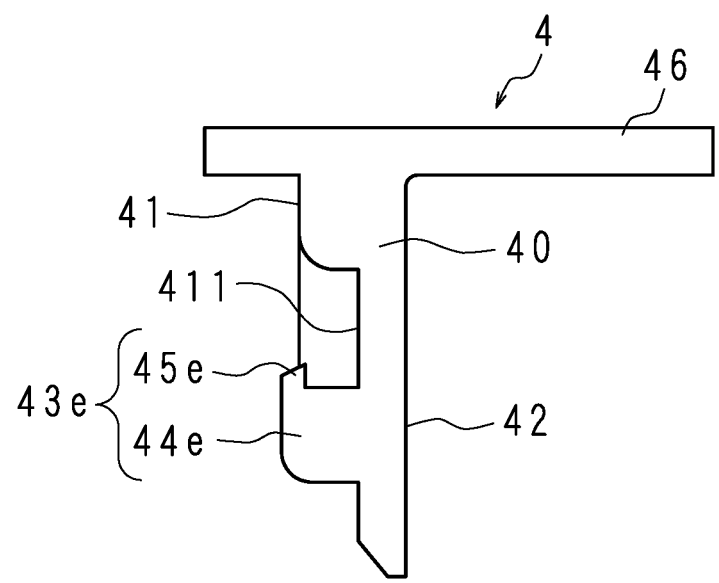
FIG. 12 is a longitudinal-sectional view schematically illustrating a second chassis according to Embodiment 5.

FIG. 12 is a longitudinal-sectional view schematically illustrating a second chassis 4 according to Embodiment 5. A configuration of the second chassis 4 according to Embodiment 5 is the same as the configuration according to Embodiment 1 other than the shape of an engaging part 43e. Therefore, the configuration equivalent thereto will be denoted by the same reference numerals, and will not be described in detail.

In Embodiment 5, a long side of a front tip of a base 44e on a side opposite to an engaging piece 45e is chamfered in a curved surface. Further, it is not limited to the curved surface, and for example, the long side may be chamfered in a taper shape.

Further, chamfering of the base 44e illustrated in Embodiment 5 may also be applied to the engaging parts illustrated in Embodiments 1 to 4, and 6 and 7.

Embodiment 6

Figure 13:
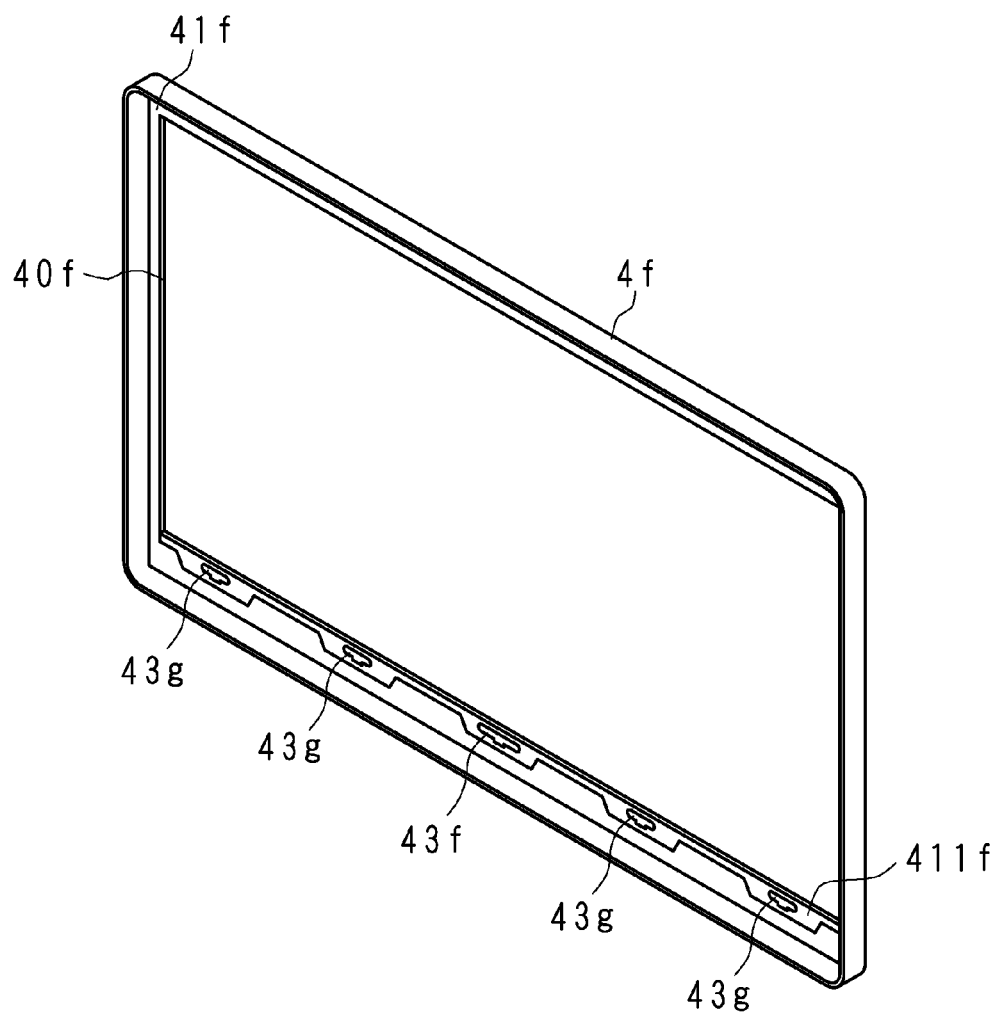
FIG. 13 is a perspective view schematically illustrating a second chassis according to Embodiment 6.

FIG. 13 is a perspective view schematically illustrating a second chassis 4f according to Embodiment 6. A configuration of a display apparatus 100 according to Embodiment 6 is the same as the configuration according to Embodiment 1 other than locations where engaging parts 43f and 43g are provided, and a use method of the optical sheet 3. Therefore, the configuration equivalent thereto will be denoted by the same reference numerals, and will not be described in detail.

In Embodiment 6, a state in which the optical sheet 3 according to Embodiment 1 is vertically reversed in the display apparatus 100 is illustrated.

The second chassis 4f has a total of five engaging parts 43f and 43g of a center engaging part 43f and the other engaging parts 43g at one edge part of a holding surface 41f which is one surface of a holding plate 40f. The number of the engaging parts 43f and 43g is not limited to the five. The second chassis 4f holds the optical sheet 3 by passing the respective engaging parts 43f and 43g through the engagement hole 32 in the ear part 31 of the optical sheet 3.

The five engaging parts 43f and 43g of the second chassis 4f are provided at the one edge part of the holding surface 41f, respectively. Further, the one edge part of the holding surface 41f is provided with reception parts 411f for receiving the edge part on the ear part 31 side of the optical sheet 3. The reception part 411f is formed copying the shape of the edge part on the ear part 31 side of the optical sheet 3 so as to be recessed with a depth substantially the same as the sheet thickness of the optical sheet 3. Furthermore, also in Embodiment 6, the reception part 411f is not indispensable.

The engaging parts 43f and 43g have bases provided to stand the reception part 411f. A length of the base in the erection direction is slightly longer than the thickness of the optical sheet 3. The base of the engaging part 43f of the central portion has a cross-sectional shape substantially the same as the shape of the engagement hole 32 provided in the center ear part 31 of the optical sheet 3, while also having substantially the same size. The bases of the engaging parts 43g other than the center have a cross section which is the same shape as the shape of the engagement holes 32 of the ear part 31 other than the center of the optical sheet 3 in the lateral direction of the optical sheet 3, but is formed in a shape elongating in the longitudinal direction.

In addition, the engaging parts 43f and 43g have engaging pieces extending from a front tip of the base. The engaging piece extends from the center of the long side on the outside the frame among the long sides in the face of the front tip of the base to the outside with a prescribed width. The engaging piece has an inclined face on the front tip side of the base so as to have a thickness decreased toward a tip.

The engaging parts 43f and 43g are formed in a hook shape in a longitudinal cross-sectional view passing through the engaging piece. A distance between a surface of the engaging piece facing the surface of the reception part 411f and the surface of the reception part 411f is substantially the same as the sheet thickness of the optical sheet 3.

The second chassis 4f having the above-described configuration is installed so that one long side thereof on the engaging parts 43f and 43g side corresponds to the edge part on the light source 51 side of the light guide plate 52. Briefly, the engaging parts 43f and 43g of the second chassis 4f according to Embodiment 6 are formed in a shape in which the engaging parts 43a and 43b of the second chassis 4 according to Embodiment 1 are vertically reversed.

The second chassis 4f illustrated in Embodiment 6 may also be applied to the display apparatus of Embodiment 7.

Embodiment 7

Figure 14:
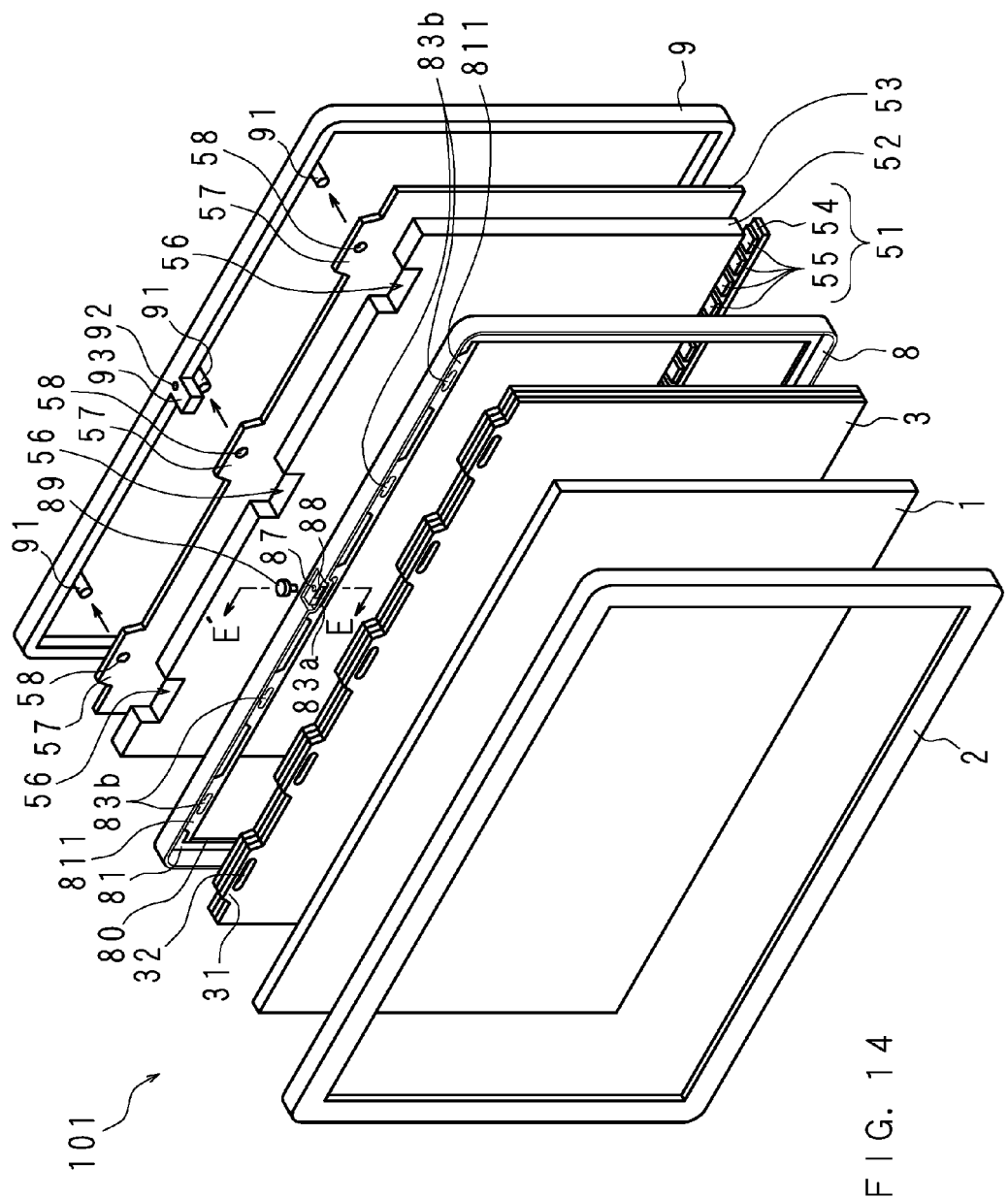
FIG. 14 is an exploded perspective view schematically illustrating a display apparatus according to Embodiment 7.
Figure 15:
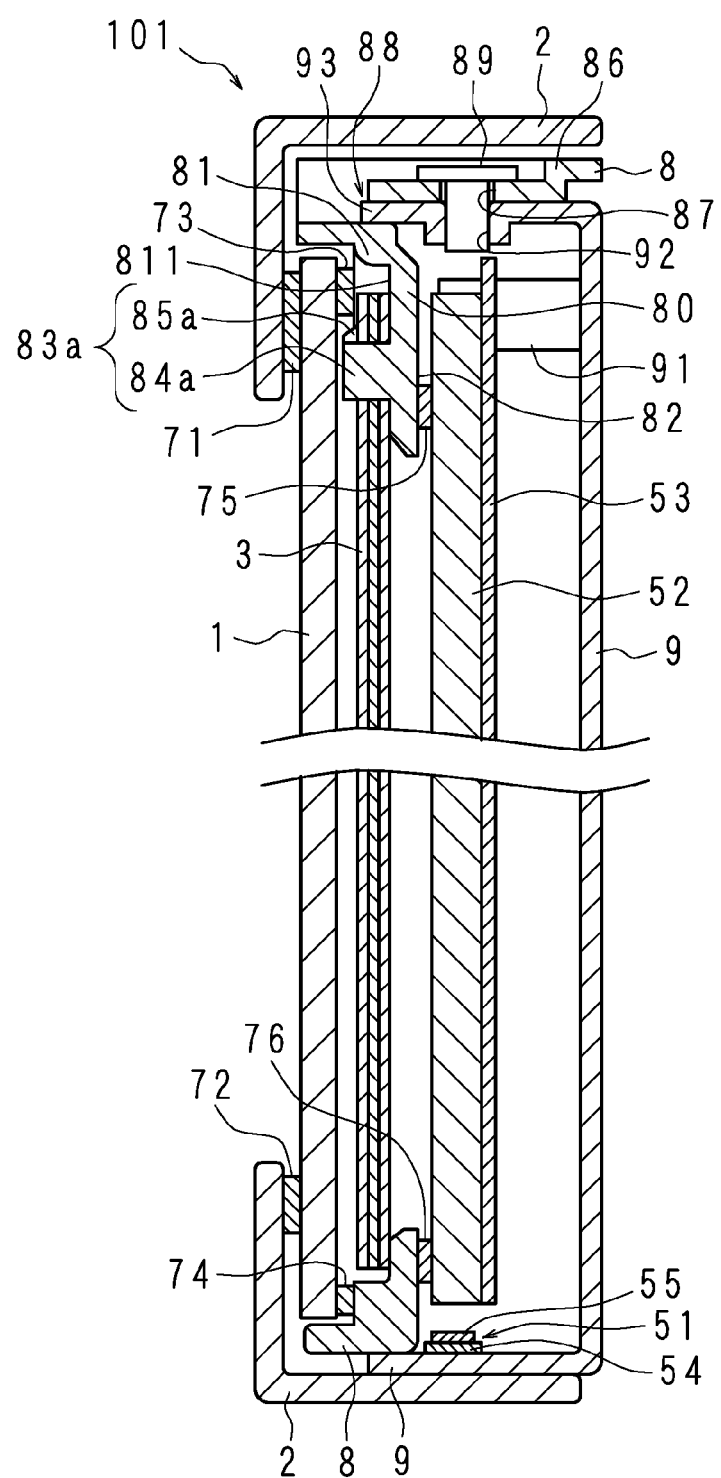
FIG. 15 is a longitudinal-sectional view taken on line E-E' of FIG. 14.

FIG. 14 is an exploded perspective view schematically illustrating a display apparatus 101 according to Embodiment 7, and FIG. 15 is a longitudinal-sectional view taken on line E-E' of FIG. 14.

A configuration of the display apparatus 101 according to Embodiment 7 is the same as the configuration of the display apparatus 100 according to Embodiment 1 other than the second chassis and the third chassis. Therefore, the configuration equivalent thereto will be denoted by the same reference numerals, and will not be described in detail.

The display apparatus 101 includes a liquid crystal panel 1, a first chassis 2, an optical sheet 3, a second chassis 8, a light guide plate 52, a light source 51, a reflection sheet 53, and a third chassis 9.

The second chassis 8 is a frame body provided with a peripheral plate 86 at outer peripheral edges of a rectangular plate-shaped holding plate 80, and a rectangular opening at the central part of the holding plate 80. As illustrated in FIG. 15, the second chassis 8 has a T-shaped cross section having the holding plate 80 as a longitudinal line and the peripheral plate 86 as a horizontal line. In addition, the second chassis 8 is provided with a plurality of engaging parts 83a and 83b at an edge part on the one long side of the one surface 81 of the holding plate 80. The plurality of engaging parts 83a and 83b include a total of five engaging parts of a center engaging part 83a and the engaging parts 83b. Since a configuration of the engaging parts 83a and 83b is the same as the configuration of the engaging parts 43a and 43b according to Embodiment 1, the configuration equivalent thereto will be denoted by the same reference numerals, and will not be described in detail.

The second chassis 8 has a positioning hole 87 longitudinally penetrating in one surface of the peripheral plate 86 on the long side provided with the engaging parts 83a and 83b. The positioning hole 87 penetrates on a surface 82 side of a side opposite to the surface 81 provided with the engaging parts 83a and 83b at a position separated from the center of the one surface of the peripheral plate 86 on the long side at a prescribed distance, in order to avoid interference with the holding plate 80. In addition, the second chassis 8 has an insertion port 88 vertically penetrating in the holding plate 80. The insertion port 88 penetrates at a symmetrical position in the thickness direction with the positioning hole 87 and the holding plate 80 interposed therebetween, and at a location of the inside from an outer periphery of the second chassis 8 at a prescribed distance.

The third chassis 9 is formed in a rectangular parallelepiped box shape with one surface open. The third chassis 9 is provided with three columnar members 91 arranged at an edge part on one long side of a bottom thereof in the longitudinal direction. Each columnar member 91 is formed in a substantially cylindrical shape, and is provided to stand on the bottom of the third chassis 9.

The third chassis 9 has a positioning hole 92 penetrating in the side face on the edge part side provided with the columnar members 91 in the lateral direction of the bottom. The positioning hole 92 penetrates at a position separated from the center of the side face at a prescribed distance. Further, the third chassis 9 includes a convex part 93 of which an end portion of the side face in the vicinity of the positioning hole 92 extends with a prescribed width. A direction in which the convex part 93 extends is perpendicular to a direction in which the positioning hole 92 penetrates and the bottom of the third chassis 9.

The second chassis 8 and the third chassis 9 according to Embodiment 7 are assembled with other major parts as described below to form the display apparatus 101.

First, the reflection sheet 53 is installed on the bottom of the third chassis 9. Three convex parts 57 of the reflection sheet 53 and three columnar members 91 of the third chassis 9 have a positional relationship corresponding to each other. The hole 58 of the convex part 57 has a shape substantially the same as the cross-sectional shape of the columnar member 91. The reflection sheet 53 is held by penetrating the holes 58 of three convex parts 57 by the three columnar members 91 of the third chassis 9, respectively.

The light source 51 is installed inside of a side face of the one long side on a side opposite to the side provided with the columnar members 91 of the third chassis 9 in the longitudinal direction, so that an emission direction thereof is oriented inwardly.

The light guide plate 52 is also installed on the bottom of the third chassis 9. The light guide plate 52 is installed so that an end face on a side opposite to the notches 56 faces the light source 51, and one wide surface faces the reflection surface of the reflection sheet 53. Three notches 56 of the light guide plate 52 are provided for avoiding the columnar members 91 passing through the holes 58 of the reflection sheet 53.

Next, the second chassis 8 is installed so as to cover the opened one surface of the third chassis 9 with the holding plate 80. An inner periphery of the peripheral plate 86 of the second chassis 8 is larger than the outer periphery of a side plate of the third chassis 9. The inner periphery of the peripheral plate 86 of the second chassis 8 is fitted to the outer periphery of the side plate of the third chassis 9 on which the light source 51, the light guide plate 52, the reflection sheet 53 and other parts are placed. In this case, the second chassis 8 is adapted so that one long side on the engaging parts 83*a* and 83*b* side thereof corresponds to the notches 56 side of the light guide plate 52. Further, in Embodiment 7, the fitted second chassis 8 and the third chassis 9 are positioned with each other by a longitudinal positioning pin 89 passing through the positioning hole 87 and the positioning hole 92, and an extension part 93 inserted into the insertion port 88 in the thickness direction. The positioning structure will be described below in detail. By fitting and positioning the second chassis 8 and the third chassis 9, the reflection sheet 53 and the light guide plate 52 are accurately positioned, and other parts are housed therein. The size of the opening in the holding plate 80 of the second chassis 8 is smaller than the wide surface of the light guide plate 52, and the surface 82 of the holding plate 80 of the second chassis 8 is adapted so as to press the peripheral edge part of the light guide plate 52 through the spacers 75 and 76.

The optical sheet 3 is held by the second chassis 8 so as to cover the opening of the holding plate 80 of the second chassis 8. The size of the optical sheet 3 is larger than the opening of the second chassis 8, and the peripheral edge parts of the optical sheet 3 are held by the reception parts (holding surfaces) 811 among the annular flat surfaces 81 of the second chassis 8. The second chassis 8 positions and holds the optical sheet 3 by engaging the engagement holes 32 in the ear parts 31 of the optical sheet 3 to the respective engaging parts 83*a* and 83*b*. Details of the holding structure of the optical sheet 3 by the engaging parts 83*a* and 83*b* is the same as the holding structure by the engaging parts 43*a* and 43*b* according to Embodiment 1, therefore will not be described in detail. As described above, the optical sheet 3 held by the second chassis 8 diffuses light made incident on one surface of the light guide plate 52 side, and emits flat light having more uniform luminance distribution from the opposite surface.

The liquid crystal panel 1 is placed on residual portions of the reception parts 811 of the optical sheet 3 in the holding plate 80 of the second chassis 8 through the spacers 73 and 74, and is pinched between the frame part of the first chassis 2 through the spacers 71 and 72.

The size of the opening of the first chassis 2 is smaller than the display surface of the liquid crystal panel 1, and the inner periphery of the side plate of the first chassis 2 is larger than the outer periphery of the peripheral plate 86 of the second chassis 8. The second chassis 8 is adapted so that the outside of the peripheral plate 86 thereof is fitted to the inside of the side plate of the first chassis 2. In this case, the display surface of the liquid crystal panel 1 is exposed from the opening of the frame part of the first chassis 2, and thereby it is possible to view from the outside.

In the display apparatus 101 constituted as described above, flat light which is emitted from the optical sheet 3 and has a uniform luminance distribution is made incident on the side opposite to the display surface of the liquid crystal panel 1, and is modulated at locations corresponding to a plurality of pixels based on image signals by the liquid crystal panel 1. Thereby, a viewer may view a moving image by the display apparatus 101.

Figure 16:
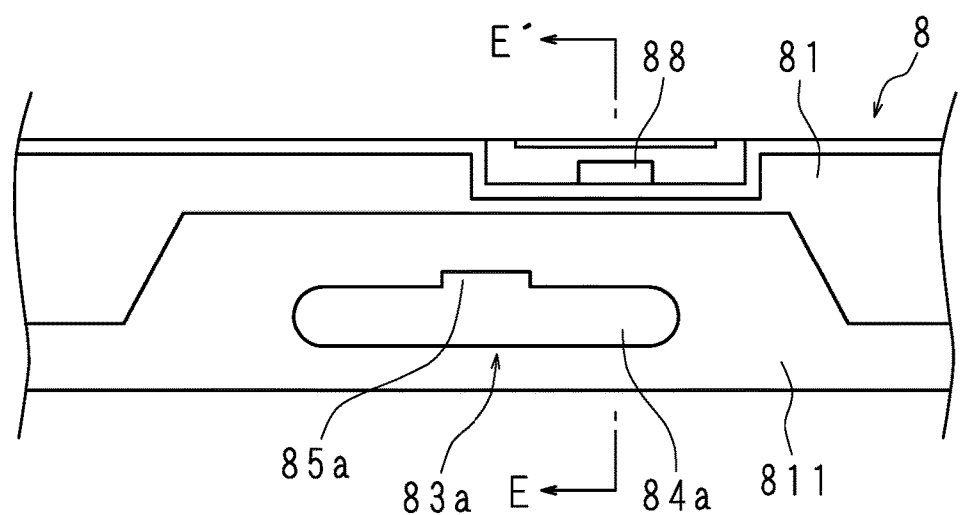
FIG. 16 is a front view schematically illustrating a second chassis according to Embodiment 7.
Figure 17:
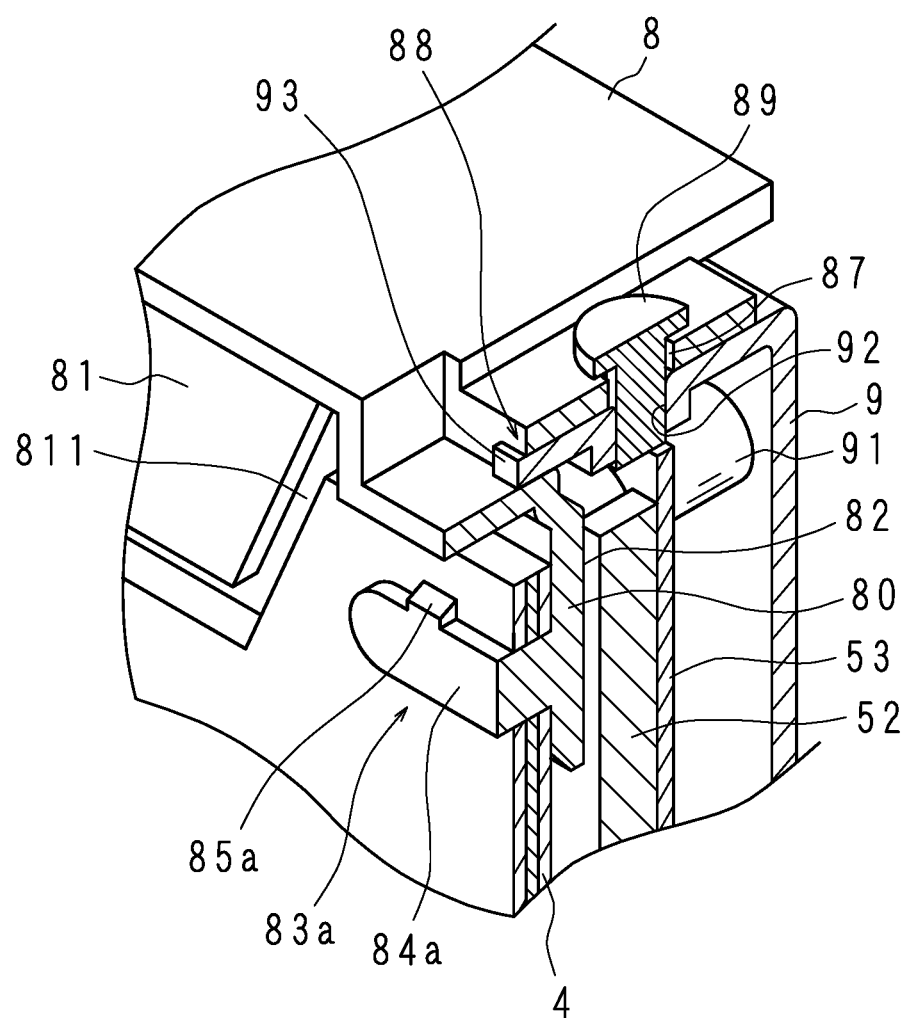
FIG. 17 is a perspective view illustrating a positioning structure of the second chassis and a third chassis.

The positioning structure of the second chassis 8 and the third chassis 9 will be described with reference to an enlarged view of the edge parts of the second chassis 8 and the third chassis 9. FIG. 16 is a front view schematically illustrating the second chassis 8 according to Embodiment 7, and FIG. 17 is a perspective view illustrating the positioning structure of the second chassis 8 and the third chassis 9. Further, FIG. 17 illustrates an appearance in which a cross section taken on line E-E' of FIG. 16 with the second chassis 8 and the third chassis 9 being locked is viewed from an inclination direction.

The shape of the positioning hole 87 of the second chassis 8 is substantially the same circle as the shape of the positioning hole 92 of the third chassis 9. The positioning hole 87 of the second chassis 8 and the positioning hole 92 of the third chassis 9 are adapted so that center lines thereof coincide with each other when the second chassis 8 and the third chassis 9 are fitted to each other. Further, in the lateral direction of the second chassis 8 and the third chassis 9, the positioning pin 89 passes through the positioning hole 87 of the second chassis 8 and the positioning hole 92 of the third chassis 9. Thereby, the positional relationship between the second chassis 8 and the third chassis 9 in the longitudinal direction and the thickness direction is determined.

The shape of the insertion port 88 of the second chassis 8 is a slit shape along the longitudinal direction of the second chassis, and the cross-sectional shape of the extension part 93 of the third chassis 9 is substantially the same as the shape of the insertion port 88. When the second chassis 8 and the third chassis 9 are fitted to each other, the extension part 93 of the third chassis 9 is adapted so as to be inserted into the insertion port 88 of the second chassis 8. Thereby, the positional relationship between the second chassis 8 and the third chassis 9 in the lateral direction is determined.

By the above-described positioning structure, even if a gap is present between the inner periphery of the peripheral plate 86 of the second chassis 8 and the outer periphery of the side plate of the third chassis 9, it is difficult to occur a shift. Therefore, it is possible to improve a positioning accuracy of the optical sheet 3, and thereby, effectively prevent an occurrence of the wrinkling or bending of the optical sheet 3.

In Embodiment 7, as illustrated in FIGS. 14 to 17, the second chassis 8 and the third chassis 9 are constituted in such a way that the positioning holes 87 and 92 penetrating in the lateral direction and the positioning pin 89, and the insertion port 88 penetrating in the thickness direction and the extension part 93 extending in the thickness direction are provided at one location of the position separated from the peripheral plate 86 or the center of one side face, respectively. However, the positioning structure between the second chassis 8 and the third chassis 9 is not limited thereto, and may be provided at different positions from each other. For example, similar to the configuration illustrated in Embodiment 7, the positioning hole penetrating in the lateral direction may be provided in the peripheral plate 86 of the second chassis 8 and the side face of the third chassis 9, and the convex part in the thickness direction and the insertion port penetrating in the thickness direction may be provided on any end portion of the short sides of the holding plate 80. In addition, a configuration which is provided with a positioning hole and an insertion port penetrating in the longitudinal direction, and a convex part or a positioning pin in the longitudinal direction, rather than in the lateral direction may be used.

Further, the positioning structure by the positioning holes 87 and 92 and the insertion port 88 illustrated in Embodiment 7 may be applied to even when the engaging part has any shape illustrated in Embodiments 2 to 6.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An optical sheet holding structure comprising:
 a frame body holding peripheral edge parts of the optical sheet at a holding surface of flat and hollow shape, and
 an engaging part including a base provided protrusively from the holding surface, and an engagement piece provided parallel to the holding surface from a front tip of the base to an outside of the frame body, and being engaged with an engagement hole provided in the peripheral edge part of the optical sheet, wherein
 a length of the base in a direction perpendicular to a circumferential direction of the frame body and a length of the engagement hole in a direction perpendicular to a circumferential direction of the optical sheet are the same as each other, and
 a distance between the holding surface and the engagement piece is the same as a sheet thickness of the optical sheet.

2. The optical sheet holding structure according to claim 1, wherein the base in the engaging part has a cross section the same as a shape of the engagement hole provided in the optical sheet.

3. The optical sheet holding structure according to claim 1, wherein a plurality of engaging parts are provided,
 the plurality of engaging parts are juxtaposed in the circumferential direction of the frame body, and
 the base of a specific engaging part among the plurality of engaging parts has a cross section the same as a shape of the corresponding engagement hole provided in the optical sheet.

4. The optical sheet holding structure according to claim 3, wherein the specific engaging part is one engaging part positioned at a center of the plurality of engaging parts.

5. The optical sheet holding structure according to claim 1, wherein the holding surface has a concave formed in a portion thereof facing the engaging piece.

6. The optical sheet holding structure according to claim 1, wherein the engaging part comprises a plurality of engaging pieces juxtaposed in the circumferential direction of the frame body from the front tip of the one base.

7. The optical sheet holding structure according to claim 1, wherein the base has a front tip face parallel to the holding surface at the front tip, and a peripheral edge of a part of the front tip face opposite to the engaging piece is formed is chamfered in a flat or curved surface.

8. The optical sheet holding structure according to claim 1, wherein a length of the cross section of the base in the circumferential direction of the frame body is longer than a length thereof in the direction perpendicular to the circumferential direction.

9. A display apparatus including a display panel comprising:
 an optical sheet provided behind the display panel, and including an engagement hole on edge part;
 an optical sheet frame body holding peripheral edge parts of the optical sheet at a holding surface of flat and hollow shape; and
 an engaging part including a base provided protrusively from the holding surface, and an engagement piece provided parallel to the holding surface from a front tip of the base to an outside of the optical sheet frame body, and being engaged with the engagement hole of the optical sheet, wherein
 a length of the base in a direction perpendicular to a circumferential direction of the optical sheet frame body and a length of the engagement hole in a direction perpendicular to a circumferential direction of the optical sheet are the same as each other, and
 a distance between the holding surface and the engagement piece is substantially the same as a sheet thickness of the optical sheet.

10. The display apparatus according to claim 9, further comprising:
 a light source device provided on an opposite side of the optical sheet to the display panel; and
 a light source device frame body configured to position the light source device, wherein
 the optical sheet frame body and the light source device frame body are positioned by a positioning pin along a thickness direction in the optical sheet and another positioning pin along a direction perpendicular to the thickness direction.

* * * * *